J. V. CUNNIFF.
WINDING MECHANISM.
APPLICATION FILED MAR. 20, 1912.

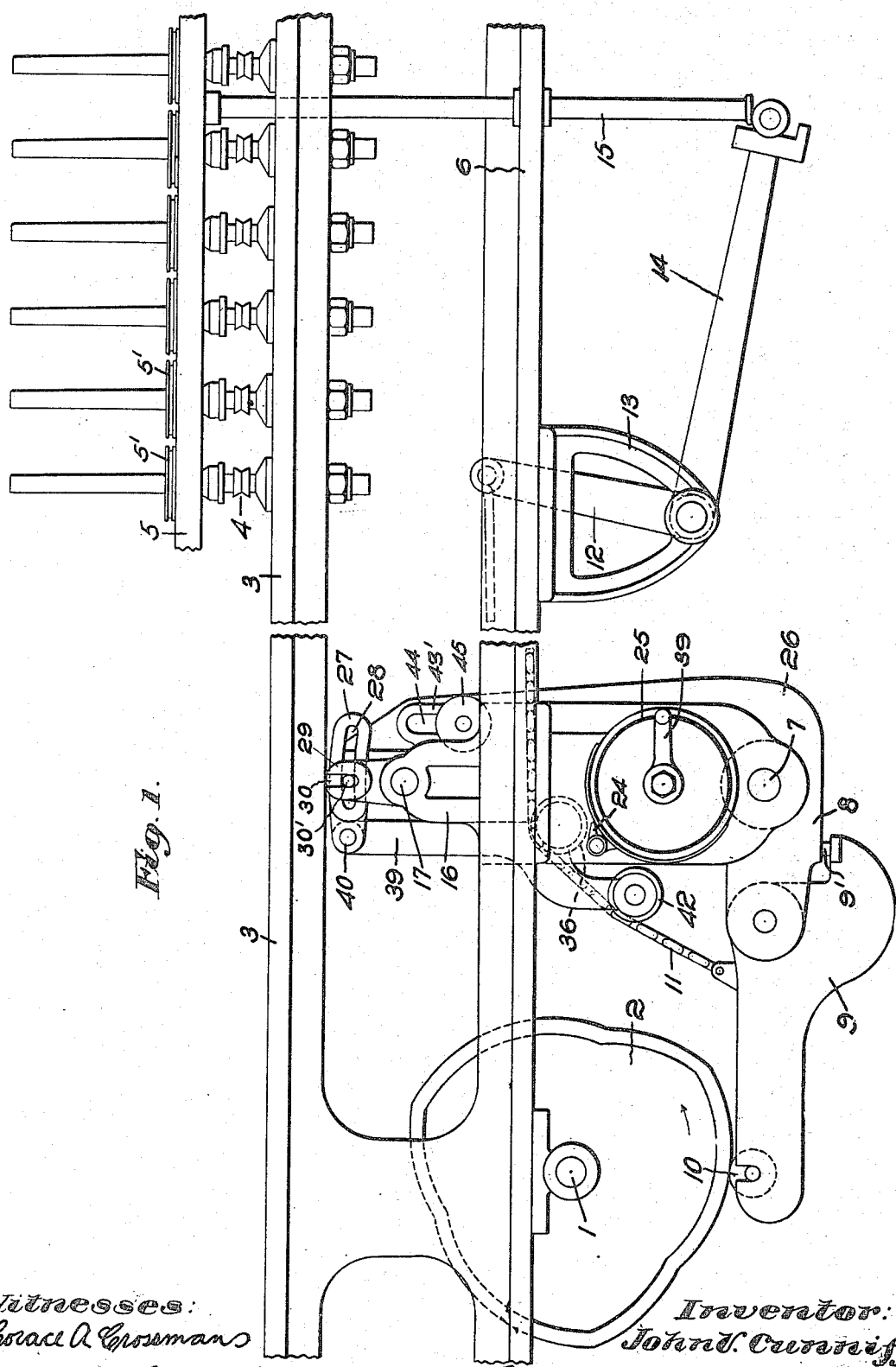

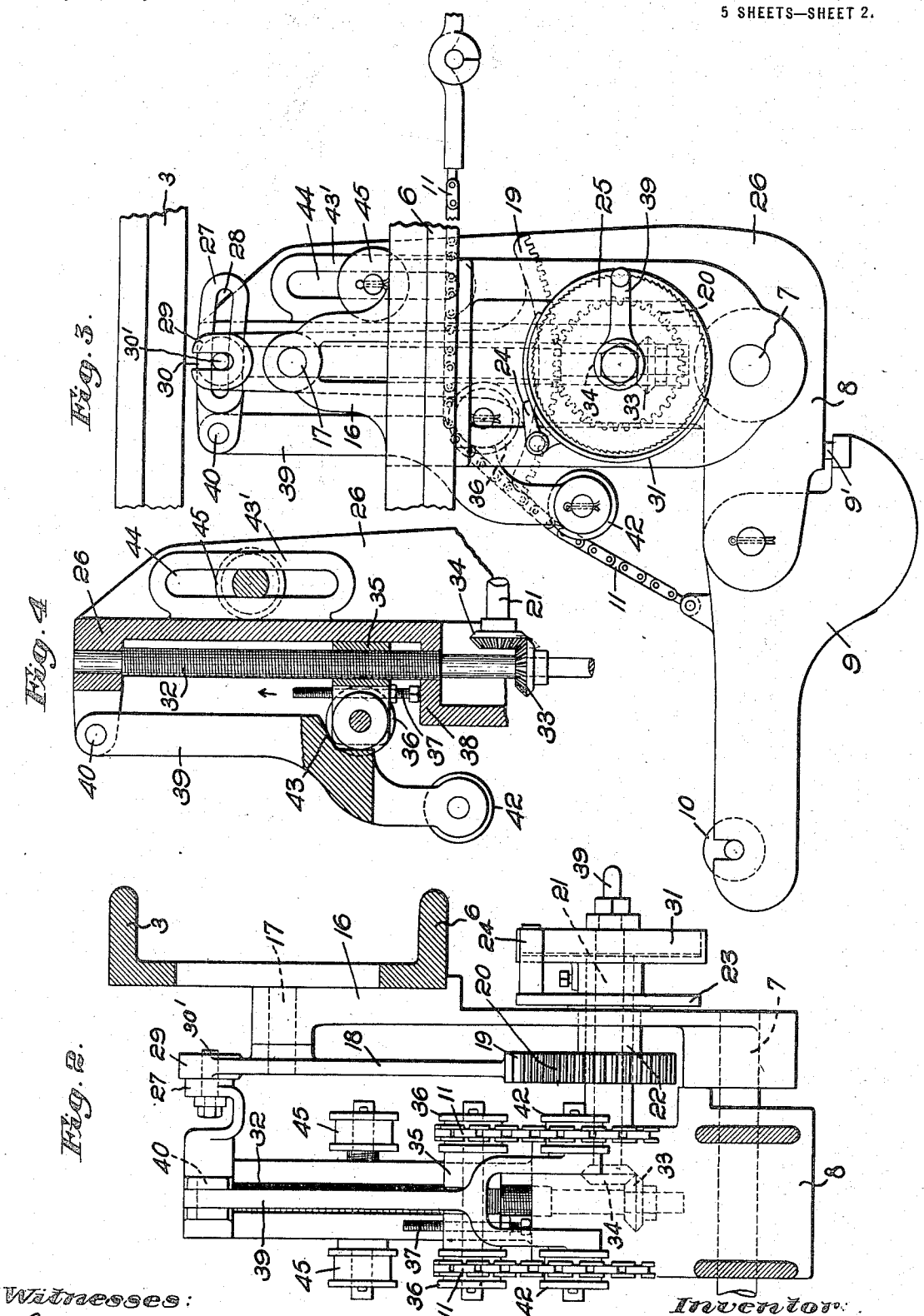

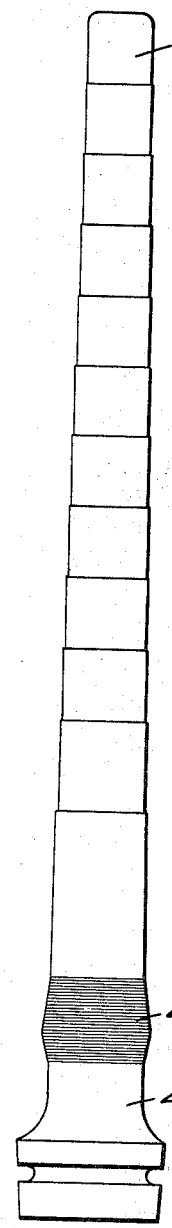
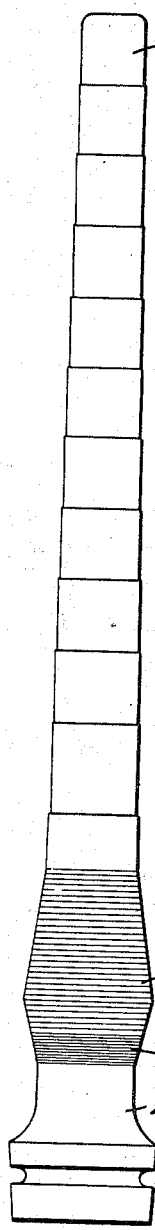
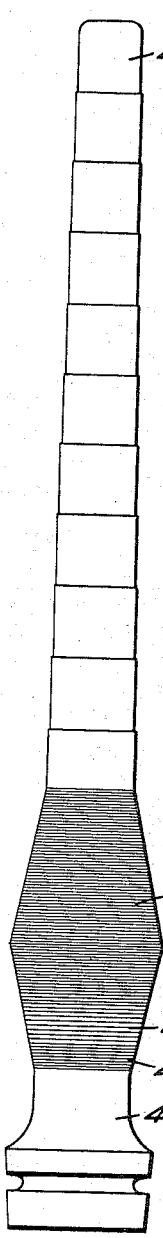
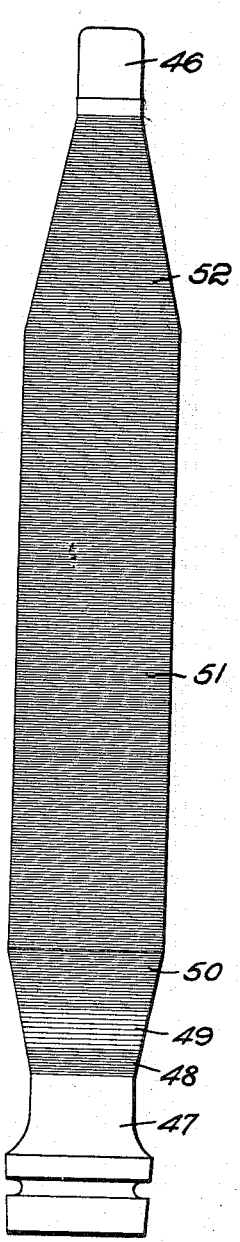
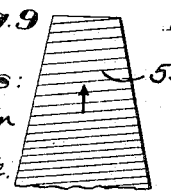
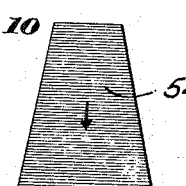

1,141,892.

Patented June 1, 1915.
5 SHEETS—SHEET 4.

Witnesses:
Horace A. Crossman
Carl L. Choate.

Inventor:
John V. Cunniff.
by Emery Booth, Janney & Varney,
Attys

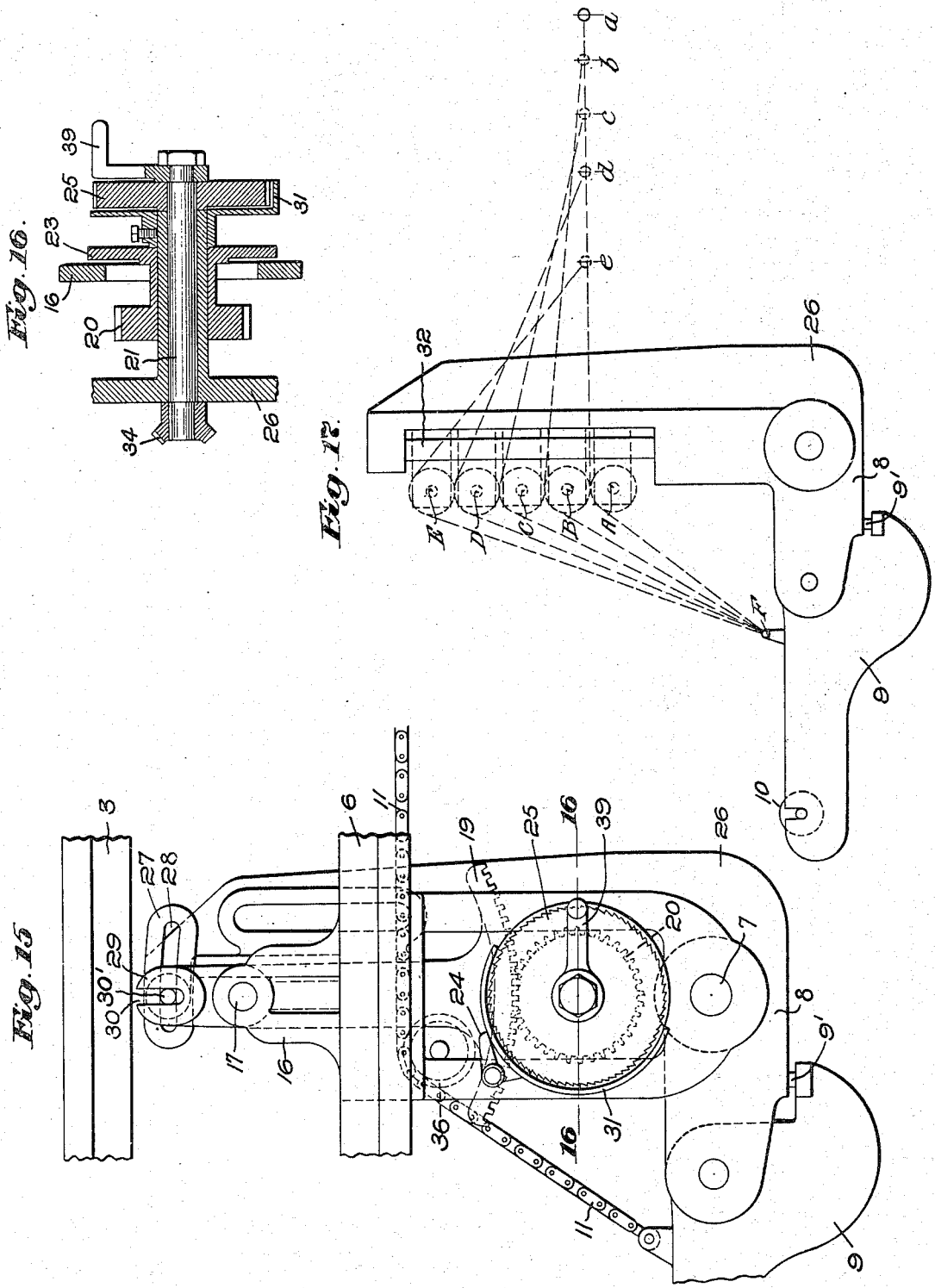

UNITED STATES PATENT OFFICE.

JOHN V. CUNNIFF, OF FALL RIVER, MASSACHUSETTS, ASSIGNOR TO JAMES K. LANNING, OF BOSTON, MASSACHUSETTS.

WINDING MECHANISM.

1,141,892.     Specification of Letters Patent.     Patented June 1, 1915.

Application filed March 20, 1912. Serial No. 685,030.

*To all whom it may concern:*

Be it known that I, JOHN V. CUNNIFF, a citizen of the United States, and a resident of Fall River, in the county of Bristol and State of Massachusetts, have invented an Improvement in Winding Mechanism, of which the following description, in connection with the accompanying drawings, is a specification, like characters on the drawings representing like parts.

This invention relates broadly to winding mechanism adapted to build up a yarn package upon a yarn receiver by laying successive layers of yarn upon the receiver progressively from one end thereof to the other; so that said yarn may be easily withdrawn from said yarn package by draft along the axis of the yarn package; the yarn receiver being continuously rotated so that the winding takes place continuously from beginning to end of the formation of the yarn package.

Specifically but not exclusively the invention relates to the provision of such mechanism for use in ring spinning or twisting frames wherein the winding is carried on simultaneously and continuously with a spinning or twisting operation.

In order that the principle of the invention may be readily understood, I have chosen to illustrate that embodiment of my invention consisting of builder mechanism for ring spinning frames.

Figure 11:
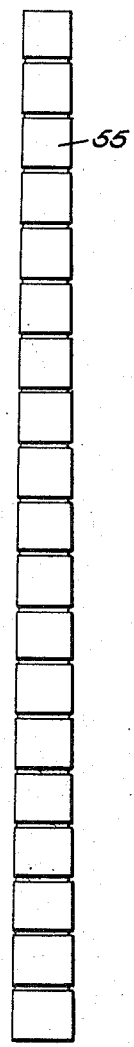
Figure 12:
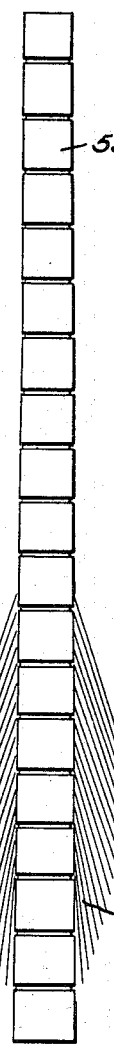
Figure 13:
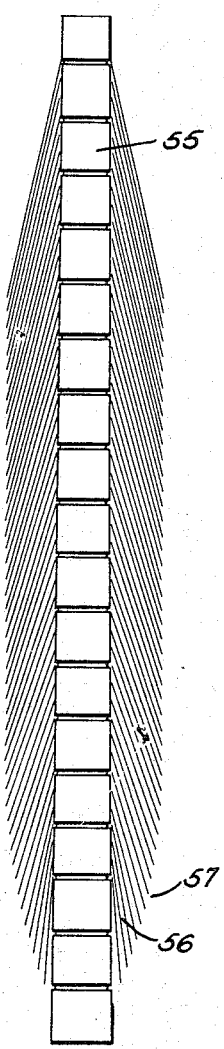
Figure 14:
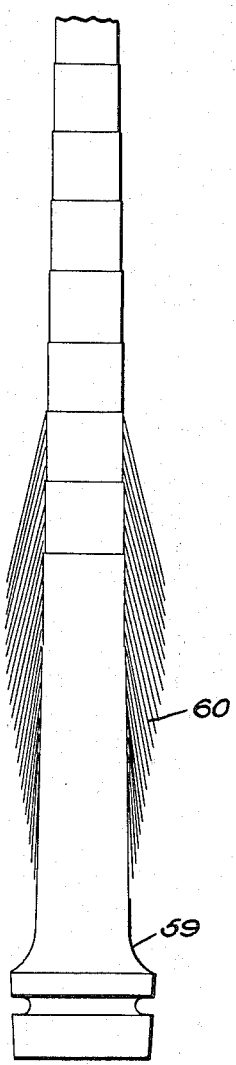

In the drawings: Figure 1 is a front elevation of one form of builder mechanism for ring spinning frames constituting an embodiment of my invention; Fig. 2 is a view of said mechanism partially in vertical transverse section and partially in end elevation; Fig. 3 is a view in side elevation of a portion of the mechanism shown in Fig. 1, upon an enlarged scale; Fig. 4 is a view mainly in longitudinal section of a portion of the mechanism; Figs. 5 to 8 inclusive, represent various stages in the building of the yarn package upon a wooden bobbin, in accordance with one embodiment of my invention; Figs. 9 and 10 are diagrams representing the turns or coils of successive conical layers of said yarn package; Fig. 11 is a side elevation of a paper tube upon which the yarn package may be wound, in accordance with my invention; Figs. 12 and 13 are diagrammatic, sectional views representing different stages in the formation of the yarn package upon said paper tube; Fig. 14, a view similar to Fig. 12, but representing the yarn package wound upon a wooden bobbin without the formation of a feeler bunch; Fig. 15 is a view similar to Fig. 3, but omitting certain supplementary parts hereinafter referred to; Fig. 16 is a longitudinal section view taken through one of the shafts of the apparatus; and Fig. 17 is a diagrammatic illustration indicating certain positions of the flexible member during the winding operation.

In yarn or thread winding mechanism to which my invention relates, the coils of yarn are laid along the yarn receiver by effecting a relatively oscillatory movement of a yarn guide and the yarn receiver along the latter for a portion of its length, which movement is generally called the "traverse"; and the package is built by shifting the path of this relative movement progressively along the axis of the yarn receiver, which shifting is generally termed the "gain". In the formation of such a yarn package a maximum diameter is reached at a point above the base due to the coöperative effect of the traverse and the gain; and a portion of the package from its lower end to such point of maximum diameter is termed the "base"; while the conical form resulting at the other end of the yarn package is termed the "chase", or the "taper"; and its terminus the "nose" of the cop.

My invention provides means whereby the package may be wound and formed with efficiency in a winding or spinning or twisting machine; and particularly in a spinning or twisting machine it furnishes means whereby the tension of the yarn in winding may be well controlled and thereby the lay of the yarn benefited. In the formation of the base of the package the invention provides means whereby the successive layers of yarn may be so laid, one over the other, until the full diameter of the package is secured, that each bottom coil of each layer is laid safely up and above the bottom coil of the preceding layer (assuming the yarn receiver to be upright and the yarn to be wound thereon from the bottom upward as in the preferred arrangement of parts of mechanism embodying my invention); and while the mechanism accomplishes this broadly in the formation of the base of the package it may be arranged to continue the same winding effect throughout the entire length of the package. This feature of the winding is accomplished by increasing the gain and preferably by progressively increasing the gain throughout the formation of the base of the package; and such increase of gain may be effected throughout the whole length of the package. Coöperatively with this, mechanism is provided to increase the traverse throughout the formation of the base and preferably throughout the formation of the whole package. The result of this increase of traverse is obviously to lay each successive layer of yarn over a slightly greater extent axially of the package; and further, due to the constant speed of the spindle or yarn receiver, and in ring frames particularly, due further to the constant speed of the feed rolls, if each traverse is effected in the same period of time (which is accomplished by giving the primary controller of the traverse movement a stroke constant in time and distance) the yarn each time will be laid in coils a little more widely separated.

A ring spinning frame constructed in accordance with my invention is provided with a ring rail and continuously rotating yarn receivers herein represented as spinning spindles having bobbins of paper or similar tubes thereon. Within the scope of my invention the yarn may be spun or wound upon the bare spindles. The ring rail constitutes a yarn guiding means, and I cause a relative to and fro traversing movement between said yarn guiding means and said yarn receivers. Preferably this is effected by imparting the described traversing movement to the ring rail.

My invention may be practised in many different ways. I have herein shown one form of mechanism well adapted for the purpose.

Referring more particularly to the drawings and first to Figs. 1 to 4 inclusive, the builder cam is indicated at 2 in Fig. 1, it being fast upon a shaft 1 supported upon the framing and driven at a preferably constant speed in any suitable manner in the direction of the arrow thereon, as from a worm shaft, itself driven by sprocket gearing from the main drive shaft of the spinning frame. I am enabled, because of my invention, to drive the shaft 1 and the cam 2 at a higher rate of speed than heretofore without changing the speed at which the drawing or feed rolls and the spindles are driven, and therefore to impart more rapid traverses to the ring rail, without, however, changing the speed of the spindles, which are preferably driven by bands from the drum and hence independently of the ring rail. I have obtained excellent results by employing a sprocket gear having eight teeth, engaging the sprocket chain to which I have referred, instead of the usual fourteen tooth sprocket gear, thus substantially doubling the speed of the ring rail and obtaining an open wind. The spindle rail is represented at 3, the spindles at 4, the ring rail at 5, the spinning rings at 5', and the box rail or frame of the spinning frame at 6. These parts are preferably of usual formation and construction, the spindles being continuously rotated in one direction preferably by bands from the usual drum, and the yarn being delivered thereto by the usual sets of drawing rolls, not shown. Suitably mounted in the framing of the machine upon a stud or pivot 7 is a builder lever 8 preferably having a member 9 relatively adjustable therewith by set screw or otherwise as indicated at 9' and having a roll 10 engaging the periphery of the builder cam 2. Connected to the builder lever 8, 9, is a sprocket chain or other suitable flexible connection 11, which at its opposite end is connected to the arm 12 of a bell crank lever mounted in a bracket 13 secured to the frame 6, and having an arm 14 upon which rides the lower end of the poker arm or rod 15 depending from the ring rail 5. The bell crank lever having the arms 12 and 14, I have herein termed the "ring rail lifting means" for convenience of description. The form of such lifting means may be varied within the scope of my invention. If desired, the chains 11 may be arranged in pairs and a suitable number of sprocket chains, bell crank levers and poker arms or rods are provided to impart a steady up and down movement to the ring rail 5, and preferably a ring rail and a row of spindles are arranged at each side of the spinning frame.

In building the yarn package, the yarn is laid upon the receiver in a series of nested cones, each of which is formed during a traverse of the ring rail. In order that these traverses may advance along or with relation to the receiver, an incremental gain is imparted to the traversing mechanism preferably between successive traverses. The traverse is maintained undiminished, and preferably I impart a regular or constant uniform increase to the traverse while maintaining the gain undiminished and preferably while progressively increasing the gain. The preferred constant increase in the traverse, which preferably is instituted at or near the base of the yarn receiver, and may continue either to the tip thereof or to some suitable point intermediate the base and the tip, effects the laying of the yarn of each layer or traverse on slightly more open lines than the preceding traverse. The effect of this is to position uniformly the yarn laid on each traverse safely past or ahead of the yarn laid by the preceding traverse. The described incremental increase of the gain tends safely to position the bottom coil of each layer ahead of the bottom coil of the preceding layer, and the progressive increase in the gain assists what would otherwise be a constant gain safely to effect this object. Inasmuch as each traverse is increased over its predecessor, each traverse advances more at the top of the wind than at the bottom thereof. The effect of the described traverse and gain are to build a yarn package, which at the bottom extends from the surface of the receiver to a maximum diameter without laying the bottom coil of any wind or traverse on top of or below the bottom coil of the preceding layer or traverse. The slight but continuous incremental increase in the gain together with the direct increase in the traverse lays the yarn so uniformly that the chase of the yarn package is formed with a straight line constituting a conical bottom in vertical cross section until the maximum diameter of the cop or other yarn package is reached. Such maximum diameter is maintained until the tip of the yarn package is reached. Thus, the increase of traverse and incremental increase in gain are constantly effective to produce and maintain a correct and advantageous form of package. The formation of the yarn package is commenced with a certain minimum length of traverse, which may be of any desired extent, as for example, seven eighths of an inch, this traverse being gradually increased either throughout the entire length of the yarn package or at some suitable point intermediate the ends thereof, after which the package may be continued with an undiminished and preferably uniform traverse. I have obtained excellent results by commencing the yarn package with a traverse of seven eighths of an inch and continuing the increase in the traverse to the upper end of the package where the traverse is one and a half inches or even more. Within the scope of my invention, the up and down portions of each traverse may be imparted in equal or unequal times. As hereinafter disclosed, the upward portion of the traverse occupies a less length of time than the downward portion thereof. While I refer to the increase in the traverse as constant, this term is employed generically or broadly to refer to a preferably regular increase in the traverse, such increase occurring at a certain part of each traverse, or if desired at a certain part of each of a series of traverses. I preferably impart the increase to the traverse and the increase to the gain during the up-stroke of the ring rail and preferably near the end of such up-stroke and terminating with the end of the up-stroke. Inasmuch as the builder cam rotates preferably at a constant speed, and inasmuch as the traverse is regularly increased, it follows that the speed of the ring rail is correspondingly increased, and inasmuch as the addition to the traverse and the addition to the gain are imparted at or near the end of the up-stroke of the ring rail, it follows that the speed of movement of the ring rail is accelerated each time toward the end of its up-stroke—that is, when the yarn is winding upon the nose of the yarn package. In accordance with the present embodiment of my invention, the increase in the traverse and the increase in the gain are imparted at or near the upper end of each up-stroke of the ring rail. Such increase in speed of the ring rail co-acts to secure a slight separation of the turns or winds of the conical layers; that is to say, it prevents the superposition of one coil of a layer directly upon another coil of the same layer. Heretofore it has been impossible in practice so to speed up the ring rail as to prevent the turns or coils of each conical layer from being superposed more or less throughout the building of the package. This necessarily resulted in the uneven delivery of the yarn from the package in unwinding. With my invention, I am enabled to lay a coil of each conical layer against the side of or as close as desired to the preceding coil of that layer, but not overlying the same, thus securing the even paying off of the yarn. In the present embodiment of the invention both the traverse and the gain are effected through the chain or other flexible connection or connections 11. Herein the chain 11 is represented as attached fixedly at both ends, and the longitudinal pull imparted thereto by the builder cam 2 rocks the bell crank lever 12, 14 through arcs, the angular extent and position whereof are modified as hereinafter set forth, by mechanism acting upon said chain 11 between the ends thereof to effect the laying of the yarn by traverses which are maintained undiminished and preferably have a regular, uniform increase, and by gains which are also maintained undiminished and which preferably progressively increase. In defining the chain 11 in the disclosed embodiment of the invention, as fixedly attached or connected at one end portion to the builder lever or member, or as connected thereto at a fixed distance from the end of said lever or member, and in defining said chain as fixedly attached to the bell crank lever 12, 14 or corresponding part, I do not preclude an adjustment or change in the point of connection of said chain ends between different winding operations, but I thus distinguish from mechanisms wherein the end of the chain is so connected to a part or device upon the builder lever, as to move along said builder lever during the winding operation.

In order to secure a traverse and a gain of the character above indicated, I have provided adjunctive means coöperating with said builder lever and the connections there-from and which may be widely varied within the scope of the invention, but which are herein represented as acting upon the chain 11 and preferably are such that the invention may be readily applied to existing types of ring spinning frames. Herein for the purpose I have mounted upon the box rail 6 a bracket 16 indicated most clearly in Fig. 2, and upon the upper end thereof have mounted upon a pivot or stud 17 a lever 18 having at its lower end a toothed segment 19 constantly meshing with a gear 20 loose upon a shaft 21, shown most clearly in Fig. 4, but having a hub 22 extending through said bracket 16 and having fast thereon a disk 23 carrying a pawl 24, shown most clearly in Fig. 3, and adapted to engage the teeth of a ratchet 25 fast upon said shaft 21 and adapted when intermittently actuated by said pawl 24 to impart a step by step rotation to said shaft 21. Said mechanism constitutes one form of pick mechanism for imparting step by step rotation to the shaft 21.

It will be observed that with the pick mechanism arranged as shown, the pick takes place while the ring rail is completing the last portion of its up-traverse. Since the pick mechanism in this embodiment of the invention effects both the gain and the traverse conjointly with the other elements herein specified, it results that not only is the incremental increase in gain added just at the time when the ring rail is completing the up portion of its traverse, but also since increase in the traverse increases the general speed of the ring rail during the traverse (since the traverse takes pace in the same time), it follows that the traverse is speeded up just as the ring rail is completing its up-stroke. These two factors coöperate in the operation of the mechanism to secure the proper laying of the yarn by tending first to keep the coils of each traverse laid well above each other at the top, and second to reduce the number of coils laid at the top,—that is, when the yarn is being wound upon that portion of the receiver that is of the smallest diameter, and hence when yarn breakage is most apt to occur. The number of coils laid at the top portion of each traverse is reduced in the manner described, inasmuch as the number of coils laid at any portion of the yarn package varies directly as the speed of the ring rail in traversing such portion of the package. The described increase in the speed of the ring rail at the upper portion of each traverse not only tends to compensate for the inherent tendency of a ring spinning mechanism to lay more winds of yarn at the upper portion of each traverse,—that is, on the portion of the yarn receiver that is of the least diameter,—but it also tends to compensate for the lag of the traveler at the upper portion of the up-stroke of the ring rail, and therefore results in less variation in the speed of the traveler due to its lag at this portion of the up-stroke, and not only tends to reduce causes effecting the yarn breakage, but tends to produce a yarn package wound with more uniform tension throughout.

The lever 18 carrying the segment 19 may be oscillated in any suitable manner but preferably by the movement of the builder arm lever 8, 9. Herein for the purpose I have provided an arm 26 pivoted co-axially with the builder lever 8, 9 and having at its upper end a lateral extension 27 provided with transverse slot 28 most clearly indicated in Fig. 3. The lever 18 extends upwardly beyond its pivot 17 as indicated at 29 in Fig. 3, and is there provided with an open slot 30 receiving a bolt 30' extending through said slots 28, 30, so that by securing said bolt in any portion of the transverse slot 28 the relation of the segment 29 with the pinion 20 may be varied. The arm 26 is provided with a sleeve 26' (Fig. 16) receiving the shaft 21. The sleeve 26' is provided with a casing 31 partially surrounding the ratchet 25, as indicated in Fig. 3, and providing means whereby the pawl 24 engages the ratchet only at or near the end of each movement of oscillation of the segment 19. Vertically mounted in the arm 26 is a threaded shaft or screw 32, shown most clearly in Fig. 4, and fast thereon is a beveled gear 33 meshing with a beveled gear 34 fast upon the shaft 21. Held from turning upon said screw 32 is a nut 35 which at the commencement of the building of the cop is at or near the lower end of the screw 32 and is then gradually elevated by the rotation of the screw from the shaft 21. The nut 35 is here shown as provided with a pair of idle rolls 36 over which pass the chains 11, as most clearly indicated in Figs. 2 and 3. The gradual elevation of the nut 35 and consequent change in position of the chains 11 effects a constant increase in the traverse, inasmuch as the movements of the nut 35 upon the screw 32 are uniform, and also effects a progressive increase in the gain because the described upward movement of the nut 35 away from the pivot of the builder lever shortens by progressively increasing increments the distance between the point of attachment of the chain 11 to the arm 12 of the bell crank lever and the screw 32 measured along the shortest line. Referring to Fig. 17, successive positions of the nut 35 are indicated at A, B, C, D and E. One of the chains 11 is indicated in dotted lines in its various positions, the point of its attachment to the arm 12 being successively indicated at $a, b, c, d$ and $e$. The distances A—B, B—C, C—D and D—E represent regular uniform movements of the traveler nut. From these movements a regular uniform increase is given to the traverse, but the movement from A to B effects a movement of the arm 12 from $a$ to $b$, and the successive movements to C, D and E effect the movement of the arm 12 progressively increasing distances represented by $c$, $d$ and $e$. This results in an effective shortening of the chain by a progressively increasing amount with a consequent progressive increase in the gain. Moreover, inasmuch as when the ring rail 5 is in its lowermost position, the arm 14 of the bell crank lever is somewhat below and is moving toward the horizontal, it follows that the linear movements imparted by the arm 14 to the poker arm or rod 15 gradually increase in length due to the movements of said arm 14 upwardly toward the horizontal, in analogy to the increased linear movements imparted by a crank when approaching the horizontal. Such increased linear movements of the poker arm or rod 15 continue throughout the formation of the base of the yarn package at least. Therefore the two factors combine to effect a progressively increasing gain throughout the formation of the base of the yarn package and the continued movement of said arm 14 is not thereafter such as substantially to modify the character of the gain during the further formation of the yarn package.

Although I have referred to the increase in the traverse as constant, it will be understood that thereby is meant a regular increase, inasmuch as in practice the traverse is not increased at all instants of time during the operation of the mechanism, but preferably only at a certain period or part of each traverse, as will be more fully set forth hereinafter.

In order to establish the bottom position of the ring rail and to effect adjustments of such position, whereby the operation may be commenced with the minimum length of traverse or with a length of traverse greater than the minimum, I may provide any suitable means but have here shown the nut 35 as provided with an adjusting screw 37, which, when the said nut is depressed, bears upon a horizontal portion or shoulder 38 of the arm 26. After the nut 35 has been elevated by the rotation of the screw 32 in the building of the yarn packages, said nut is returned preferably by hand for the formation of the next set of yarn packages. Herein for this purpose, I have provided the shaft 21 with a crank handle 39 shown in Fig. 3, so that by rotation of said shaft and of the screw 32, the nut 35 may be lowered until it or the set screw 37 contacts with the shoulder 38 of the arm 26.

The mechanism thus far disclosed constitutes one embodiment of means whereby the traverse may be regularly or constantly increased from the basal end of the yarn package to its tip and whereby the gain may be maintained undiminished and preferably is incrementally and progressively increased during such period. In conjunction with said mechanism I may provide modifying mechanism not only to provide a feeler bunch but also to modify the character of the traverse as by terminating the increase in the traverse at a point between the base and tip of the yarn package or by modifying the gain.

Since I may wish to provide the yarn package with a short feeler bunch and then abruptly to increase the gain immediately after the formation of the bunch, or since for other reasons I may wish to provide for additional gain, I provide means to impart a suddenly increased pull upon the chains 11. For this purpose, I may provide any suitable means but have here shown the arm 26 as provided with a lever 39 pivoted thereto at its upper end at 40 and carrying at its lower end a pair of rolls 42, indicated in Figs. 2 and 3, and engaging the under side of the chains 11. The lever 39 may be suitably shaped upon its inner face as desired, to modify the character of the yarn package, but is here shown as provided between its upper and lower ends with a beveled shoulder 43, indicated in Fig. 4, wherewith engages the nut 35 at an appropriate time in the rise of the latter. This engagement of the nut with the shoulder 43 causes the lever 39 to swing toward the left, viewing Figs. 3 and 4, and thereby to impart a sudden increased pull upon the chains 11, and consequently abruptly to increase the gain of the traverse of the yarn packages. By varying the character of the lever 39, the character, extent or position of this additional gain may be varied. This mechanism for imparting an abrupt pull upon the chains 11 may, of course, be rendered inoperative in any suitable manner or be dispensed with, if I do not wish to form a feeler bunch, or if for other reasons I do not desire to provide additional gain or to modify the character of the gain. This feature is not broadly claimed herein, inasmuch as the same is broadly claimed in the copending application of Charles D. Lanning, Serial No. 713,986, filed August 8th, 1912.

In order to terminate the gradual increase in the length of taper of the yarn packages at some suitable point between the ends of the bobbin or yarn receiver instead of continuing such increase to the upper end thereof, I may provide any suitable mechanism. Herein for the purpose, in Figs. 2, 3 and 4, I have represented the arm 26 as provided with one or more lugs 43′ having a vertical slot or slots 44, within which rolls 45 may be adjustably secured at any suitable point overlying the upper faces of the chains 11. As the nut 35 is gradually elevated and further flexes the chains 11, the latter contact with the lower faces of the rolls 45 at a time depending upon the adjustment of said rolls. This engagement of the chains and rolls terminates the increase of the traverse and therefore compels the further building of the yarn packages to be effected in conical layers of uniform extent. In other words, the taper of the nested cones constituting the yarn packages continues uniform from the time of engagement of the chains 11 with said rolls 45 to the upper ends of the bobbins or yarn carriers. In that embodiment of the invention herein illustrated, the engagement of the chains 11 with the rolls 45 not only terminates the increase in the traverse, but it also abruptly increases the gain.

While any suitable means may be employed to impart the gain or incremental advance to the ring rail after each return or downward traverse, so that each conical layer is begun at an incrementally higher point upon the bobbin or other support, than the conical layer immediately preceding, in the disclosed embodiment of the invention, the effect of the travel of the nut 35 upon the chains 11 is such that the arcs of movement of the bell crank lever 12, 14 not only gradually increase in length, providing the gradually increasing lengths of conical layers, but the said arcs of movement are gradually advanced contraclockwise so that the rods or poker arms 15 descend to an incrementally higher point after each upward traverse, thus providing the gain which, as previously stated, is progressively increased. The increment of gain in the formation of the conical layers may be such as is found desirable. In practice, I have found an initial incremental gain of about one sixty-fourth of an inch to produce excellent results in winding 40's. The described incremental increase in the lengths of the traverses need not be effected between successive traverses, but may instead be effected between successive series of traverses, said series being composed of any suitable number of layers. This may be effected by changing the ratchet 25 or in other suitable manner.

Having reference to the ring frame wherein the speed of the spindles and the feed rolls is constant and the wind on of the yarn receiver is effected by lag of the traveler as related to the spindle, the lag necessarily increases as the winding progresses toward the nose of the yarn package, and the reversal of direction of the ring rail necessitates increase of traveler speed, which increase of traveler speed is a further load upon the yarn so that if the lag is excessive yarn breakage results from any unusual speed in the down stroke of the ring rail. It will be seen, therefore, that by increasing the linear speed of the ring rail progressively, as results from an increasing traverse in constant time, the ring rail is moved each time more rapidly up and down, which constantly tends to decrease the number of coils made at the nose of the cap, and therefore, tends to decrease the lag of the traveler at such place. Otherwise stated, the speed of the traveler is maintained more nearly constant and, therefore, the tension on the yarn is maintained more nearly constant. Preferably the pick controlling the gain and the increase in traverse is applied during the last portion of the up stroke, whereby this increased speed in linear movement of the ring rail is added at such time. As a result the invention makes it possible commercially to operate the ring rail with from 40 or 50 to 100% increase in the number of reciprocations of ring rail; that is, increasing linear speed of the ring rail. The result in winding is a much more uniform tension and decreased yarn breakage in the ring frame. Having reference to the utilization of such a yarn package which involves its unwinding features, the result is that the increasing traverse from base to nose gives reversely a decreasing taper from nose to base, so that the yarn withdrawn by draft axially of the package is drawn from a surface on the package approaching more and more nearly to a surface at right angles to the axis of the package. By this means as the length of yarn extending from the surface wherefrom it is being delivered to the point above the package where draft is being applied to the yarn, tends to increase, and ballooning of the yarn away from the axis of the package tends to increase, this tendency to increased ballooning effect is checked by the yarn drawing from a surface which tends to approach more and more nearly to a flat surface at right angles to the axis of the package; and when the yarn package is in a shuttle this checks the tendency of the yarn to balloon out and contact with the sides of the shuttle, which tends to decrease breakage. It is of extreme importance in order to secure the best results that the initial traverse be of the minimum length, thus causing the first laid layer to be the shortest, and that these layers gradually increase in length, since thereby in the unwinding of the cop in the weaving operation, the length of layer gradually becomes less and less from the tip of the cop toward the base, and hence there is increasingly less friction and resistance or drag to the unwinding of the yarn of the successive layers as the distance increases between the eye of the shuttle and the point at which the yarn leaves the bobbin or other package carrier. Since the drag thus becomes proportionately less as the distance between the yarn mass and the eye of the shuttle increases,—that is, since the friction and drag opposed to the unwinding of the yarn in the weaving operation, are inversely proportional to the distance of each layer from the feeding eye of the shuttle, because of the increasingly greater length of the layers toward the tip of the bobbin or other carrier, there is effected a substantially even tension on the yarn as laid in the cloth. If the winding begin with a minimum traverse, but with a gain of the full or ultimate value, the result would be that the early layers or traverses would be too long, and the desired results as regard evenness in the yarn tension would not be secured. By providing, however, a minimum gain as well as a minimum traverse, the ideal condition is secured, and by increasing the traverse and the gain, the uniformity of tension is not impaired. This result is secured by increasing the gain and more especially by progressively increasing the gain. The ideal condition is presented by progressively increasing the gain from the minimum, inasmuch as I thereby, in the early layers, obtain very short traverses with the advantages above set forth, and at the same time each layer begins safely above the commencement of the preceding layer. Furthermore, inasmuch as I start with a minimum traverse and a minimum gain, the drag due to the distance between the spinning ring and the surface of the cop tube or bobbin is not such as to prevent proper winding. If the initial traverse and gain were, in their aggregate, long, then the effect of the drag would be such that the yarn could not be properly wound. Furthermore by commencing with a minimum aggregate traverse and gain, I am enabled to reach the full diameter of the yarn package more quickly, and hence more yarn is wound onto the package at its base, without, however, obtaining longer traverses at this point. In my yarn package, as the yarn is unwound from the base toward the point of any layer, the turns of the yarn are found to be separated, thus preventing one turn of yarn pulling off another, which is not true of yarn packages with which I am familiar. In practice, it is unnecessary to "clean" the bobbin after weaving, since the entire yarn winds off. This is not true of other winds with which I am familiar. I have also been able to dispense with the conical form of the bobbin at its base usually used heretofore to start the spinning, and hence I am enabled to wind a correspondingly additional amount of yarn on the bobbin. In practice, I have discovered that the initial short layers wound in accordance with my invention constitute in themselves a very effective "bunch", and that it is not necessary to have a special "bunch". After forming such substitute for a bunch, the winding can proceed in the same manner, whereas in most bunch-forming winds with which I am familiar, after the formation of a special bunch, there is a "skip" upward or downward to begin the main winding. Furthermore a satisfactory bunch creates a strain or drag on the yarn wound below the bunch every time the yarn unwinds past and in contact with the bunch, and this creates unevenness in the tension and tends to break the yarn. I am enabled to wind the yarn upon the carrier with even tension from end to end. By decreasing the friction, as hereinbefore set forth, I am enabled to use a heavier traveler, which is a desideratum, inasmuch as the heavier the traveler, the tighter the wind. Further, as the base of the cop is reached in the unwinding (and throughout the whole package when the increase in gain is established throughout the whole package) each bottom coil of each layer (having been safely laid by means of the increase in gain over and above the bottom coil of the preceding layer) is permitted to be withdrawn without fouling with and tending to slough off the preceding layer. These advantages thus secured in the unwinding are of great practical importance in weaving where the yarn is subjected to quick intermittent draft reaching a speed of from five to ten yards a second.

In Figs. 5 to 8 inclusive, I have represented bobbins whereon yarn packages may be wound in accordance with my invention, it being understood that they may be wound upon cop tubes of paper or the like, or other carriers, or even upon the bare spindles. In said figures, the bobbin is indicated at 46. Preferably this bobbin is one shaped at its base as indicated at 47 and without the usual conical lower portion, thus permitting the spinning of an increased length of yarn thereon. While I may employ any suitable shape of bobbin, I have found it unnecessary to use a bobbin having a well defined conical lower end or base to facilitate the commencement of the yarn package. Preferably the bobbin is of gradually decreasing diameter from substantially its lower end to its tip, and may be made of smaller diameter than heretofore. If the bobbin is to be provided with a feeler bunch, I so position the set screw 37 to establish the basal position of the ring rail that a short traverse is imparted thereto. At 48, in Fig. 5, I have represented a bunch formed by a traverse of substantially three-eighths of an inch and involving but a few conical layers. Immediately after the formation of said bunch, the gain is preferably abruptly increased in the manner already described. As here represented, the length of taper of the coils 49 is substantially seven-eighths of an inch. Thereafter the gradual increase in the length of the taper commences, with the described progressively increasing gain, and I have indicated at 50 in Fig. 7, a conical layer of slightly increased taper over that indicated at 49 in Fig. 6. This increasing traverse and progressively increasing gain are here represented as continued until the yarn package is built up as indicated at 51 in Fig. 8, and terminates with a taper 52, which is here shown of substantially one and a half inches, but which may be even more. If desired, however, the maximum taper may be reached at a point more or less short of the tip end of the bobbin and even at the conclusion of the formation of the package base, as previously described, after which the taper is preferably uniform to the tip end of the package.

It has heretofore been an exceedingly difficult matter to unwind the bunch in the weaving operation. The yarn is exceedingly apt to break when the bunch is reached in the paying off of the yarn, and the weaver then discards the bunch yarn, entailing much waste. In order to prevent this breaking of the yarn at the bunch, I provide the open wind 49, the yarn of which pays off much more freely in the spinning operation, and therefore lessens to a very great degree the liability of breakage of the yarn in said bunch, thereby reducing waste.

In Figs. 9 and 10, I have diagrammatically represented the formation of two conical layers, that represented in Fig. 9 being formed during the upward traverse of the ring rail and that represented in Fig. 10 being formed in the succeeding downward traverse. These figures are merely diagrammatic, and are not intended to represent the actual number of coils in either layer. It will be noted that the coils 53 shown in Fig. 9 are inclined and much fewer in number than the coils 54 shown in Fig. 10 and which are horizontal. In both cases the coils are open, such open wind being more apparent in Fig. 9, because fewer coils are laid during the upward traverse of the ring rail which is toward the drawing rolls and consequently rapid, than are laid during the downward traverse which is away from the drawing rolls and consequently slower because of the greater strain upon the yarn. In either case the coils may be in actual contact, or may be spaced apart, but do not overlie each other. Inasmuch as the conical layers formed upon upward traverses are preferably all laid in equal periods of time, and the supply from the drawing rolls continues constant, it follows that the coils of the longer conical layers are spaced apart more widely than are those of the shorter conical layers.

In Fig. 11, I have represented a paper or other tube 55 constituting a yarn receiver, and in Figs. 12 and 13 have indicated different stages in the formation of a yarn package thereon. In Fig. 12, I have represented the basal portion only of the yarn package and have therein diagrammatically indicated the conical nested layers 56 thereof, which have been formed by a regular or constant increase in the traverse and a progressive increase in the gain, so that the base of the yarn package when wound upon a paper or other tube 55 possesses exteriorly the characteristic convex form represented at 57. Such formation is due to the fact that each bottom coil of each layer is laid safely up and above the bottom coil of the preceding layer. The described increasing traverse and gain need not be continued beyond the formation of the basal portion of the yarn package, but in Fig. 13 I have represented a completed yarn package 58, wherein the described constantly or uniformly increasing traverse and progressively increasing gain are continued to the upper or tip end of the yarn package. In Fig. 14, I have represented a wooden bobbin 59 having formed thereon the basal portion 60 of a yarn package devoid of a feeler bunch but wound with a constant or regularly increasing traverse and a progressively increasing gain.

While I have herein represented my invention as embodied in mechanism operating by "take-up" of the flexible connection, element or chain, my invention is not limited to use in a mechanism operating by "take-up" of the said flexible connection, element or chain.

From the foregoing description, it will be evident that I have provided mechanism for forming the yarn or thread package having means for giving an increasing gain, and preferably a progressively increasing gain throughout the base of the package, and preferably throughout its entire extent, together with means for maintaining the traverse undiminished and preferably in combination with means for increasing the traverse and specifically in combination with means for uniformly increasing the traverse throughout the formation of the base and preferably throughout the formation of the whole package.

While I have herein referred to the upward and the downward traverse, it is evident that these terms are descriptive merely of that embodiment of my invention selected for illustration, and that the yarn packages may be wound or formed in an upright or any other desired position within the scope of my invention.

Having thus described one illustrative embodiment of my invention, I desire it to be understood that although specific terms are employed, they are used in a generic and descriptive sense and not for purposes of limitation, the scope of the invention being set forth in the following claims.

Claims:

1. In a traverse motion for winding yarn on yarn receivers, a rotating yarn receiver, yarn guiding means coöperating with the receiver, a builder element, a builder member acted on by said element, a flexible member having a fixed point of connection with said member and operatively associated with said yarn guiding means, and governing means carried by said member and active upon said flexible member between its ends to effect through said member an increasing shift or gain of the traverse movement along the yarn receiver and an increasing traverse movement.

2. In a traverse motion for winding yarn on yarn receivers, a rotating yarn receiver, a ring rail, ring rail lifting means, a builder element, a builder arm acted on by said element, a flexible connection attached to said ring rail lifting means and connected to said arm at a fixed distance from the end of the latter, and governing means mounted upon said builder arm and active upon said flexible connection between its ends to effect through said connection an increasing shift or gain of the traverse movement along the yarn receiver and an increasing traverse movement.

3. In a traverse motion for winding yarn on yarn receivers, a rotating yarn receiver, a ring rail, ring rail lifting means, a builder element, a builder arm acted on by said element, a flexible connection attached to said ring rail lifting means and connected to said arm at a fixed distance from the end of the latter, and means mounted upon said builder arm and active upon said flexible connection to shorten the effective length of said connection.

4. In a traverse motion for winding yarn on yarn receivers, a rotating yarn receiver, a ring rail, ring rail lifting means, a builder element, a builder arm acted on by said element, a flexible connection attached to said ring rail lifting means and connected to said arm at a fixed distance from the end of the latter, and governing means mounted upon said builder arm and active upon said flexible connection between its ends to form a bight therein of progressively increasing acuteness.

5. A traverse motion for winding yarn on yarn receivers comprising, in combination, rotatable spindles, a ring rail, ring rail lifting means, a rotatable builder-element, an oscillatory builder arm adapted to be acted on by the latter, a nut carried by said arm and movable outwardly in substantially the plane of oscillation of said arm, a flexible connection adapted to be acted upon by said nut between its ends and secured to said ring rail lifting means and fixedly connected to said builder arm, and means to impart outward travel to said nut.

6. A traverse motion for winding yarn on yarn receivers comprising in combination, rotatable spindles, a ring rail, ring rail lifting means, a rotatable builder-element, an oscillatory builder arm adapted to be acted on by the latter, a nut carried by said arm, a flexible connection adapted to be acted on by said nut between its ends and secured to said ring rail lifting means and fixedly connected to said builder arm, and pick mechanism to impart travel to said nut.

7. A traverse motion for winding yarn on yarn receivers comprising, in combination, rotatable spindles, a ring rail, means to cause relative, to-and-fro traverse movements between said spindles and said ring rail for a portion only of the length of the former, and including a rotatable builder element, a builder lever, and a flexible connection to the ring rail and having a fixed connection to the builder lever, and traverse controlling means upon said builder lever and engaging said flexible connection to increase the length of said traverse movements and the gain of said movements at substantially the upper end of the relative up stroke of the ring rail and spindles.

8. A traverse motion for winding yarn on yarn receivers comprising in combination, rotatable spindles, a ring rail, a builder cam 2, a builder lever 8 having an arm 26, a bell crank lever 12, 14, a flexible connection fixedly connected to said levers, and a nut 35 movable along said arm 26 to shorten the effective length of said flexible connection.

9. A traverse motion for winding yarn on yarn receivers comprising in combination, rotatable spindles, a ring rail, a builder cam 2, a builder lever 8 having an arm 26, a threaded shaft 32 mounted in said arm, a bell crank lever 12, 14, a flexible connection 11 between said levers and having one end portion fixedly connected to said builder lever 8, a nut 35 mounted upon said threaded shaft and active upon said flexible connection, and means to impart movement to said nut along said shaft.

10. A traverse motion for winding yarn on yarn receivers comprising, in combination, rotatable spindles, a ring rail, a rotatable builder element, a builder lever and a ring-rail-rod engaging lever, both mounted to oscillate in planes lengthwise of the ring frame, a flexible element having an end fixedly connected to each of said levers, said builder lever having two arms, one adapted to be acted upon by said builder element and the second arm extending upwardly toward the ring rail, a nut mounted upon said second arm and engaging said flexible element between the ends of the latter, and means to move said nut outwardly along said second arm.

11. A traverse motion for winding yarn on yarn receivers, comprising, in combination, rotatable spindles, a ring rail, a rotatable builder element, a builder lever and a ring-rail-rod engaging lever, both mounted to oscillate in planes lengthwise of the ring frame, said builder lever having two arms, one adapted to be acted upon by said builder element and the second arm extending upwardly toward the ring rail, a flexible element having one end fixedly connected to said ring-rail-rod engaging lever and having its other end fixedly mounted to the first mentioned arm of the builder lever, a nut mounted upon said second arm of the builder lever and engaging said flexible element between the ends of the latter and means to move said nut outwardly along said second arm.

12. A traverse motion for winding yarn on yarn receivers, comprising, in combination, rotatable spindles, a ring rail, a rotatable builder element, a builder lever and a ring-rail-rod engaging lever, both mounted to oscillate in planes lengthwise of the ring frame, said builder lever having two arms, one adapted to be acted upon by said builder element and the second arm extending upwardly toward the ring rail, a flexible element having one end fixedly connected to said ring-rail-rod engaging lever and having its other end fixedly connected to the first mentioned arm of the builder lever, a flexible element engaging device mounted upon said second arm of the builder lever, and means to move said device outwardly along said second arm.

13. A traverse motion for winding yarn on yarn receivers, comprising, in combination, rotatable spindles, a ring rail, a rotatable builder element, a builder lever and a ring-rail-rod engaging lever, both mounted to oscillate in planes lengthwise of the ring frame, a flexible element having an end fixedly connected to one of said levers and having its other end fixedly connected to the other of said levers, a device movable along said builder lever in a direction away from the fulcrum thereof during the operation of the mechanism, said device engaging the flexible element between its ends, and means to move said device along said lever.

14. In a traverse motion for winding yarn on yarn receivers, a rotating yarn receiver, yarn guiding means coöperating with the receiver, a builder element, a builder arm acted on by said element, a flexible member having a fixed point of connection with said arm and operatively associated with said yarn guiding means, and governing means carried by said arm and active upon said flexible member between its ends to control the traverse and the gain.

15. In a traverse motion for winding yarn on yarn receivers, a rotating yarn receiver, a ring rail, ring rail lifting means, a builder element, a builder arm acted on by said element, a flexible connection attached to said ring rail lifting means and connected to said arm at a fixed distance from the end of the latter, means mounted upon said builder arm and active upon said flexible connection between its ends to flex the same, and means to move said active means along said builder arm.

16. In a traverse motion for winding yarn on yarn receivers, a rotating yarn receiver, a ring rail, ring rail lifting means, a builder element, a builder arm acted on by said element, a flexible connection attached to said ring rail lifting means and to said arm, and means mounted upon said builder arm and active upon said flexible connection between its ends, to lift toward the yarn receiver that portion of said flexible connection between said active means and said ring rail lifting means.

17. In a traverse motion for winding yarn on yarn receivers, a rotatable yarn receiver, yarn guiding means coöperating with said receiver, a builder element, a builder member acted upon by said element and having a portion extending in a direction toward said yarn receiver, a flexible connection between and operatively associated with said yarn guiding means and fixedly connected to said builder member and by the movement of which by the builder element, a series of traverse movements is imparted to said yarn guiding means, means upon said portion of said builder member and active upon said flexible connection, and means to move said active means along said portion of said builder member.

18. A traverse motion for winding yarn on yarn receivers, comprising, in combination, rotatable spindles, a ring rail, ring rail lifting means, a rotatable builder element, an oscillatory builder arm adapted to be acted on by the latter, a device carried by said arm and movable outwardly in substantially the plane of oscillation of said arm, a flexible connection adapted to be acted upon by said device between its ends and secured to said ring rail lifting means and fixedly connected to said builder arm, and means to impart outward travel to said device.

19. A traverse motion for winding yarn on yarn receivers comprising in combination, rotatable spindles, a ring rail, ring rail lifting means, a rotatable builder element, an oscillatory builder arm adapted to be acted on by the latter, a device carried by said arm, a flexible connection adapted to be acted on by said device between its ends and secured to said ring rail lifting means and fixedly connected to said builder arm, and pick mechanism to impart travel to said device.

20. In a traverse motion for winding yarn on yarn receivers, a rotating yarn receiver, yarn guiding means coöperating with the receiver, a builder element, a builder arm acted on by said element, a flexible member having a fixed point of connection with said arm and operatively associated with said yarn guiding means, governing means carried by said arm and active upon said flexible member between its ends to control the traverse and the gain, and supplemental means active upon said flexible connection between its ends to increase the gain during the formation of the initial portion of the package.

In testimony whereof, I have signed my name to this specification, in the presence of two subscribing witnesses.

JOHN V. CUNNIFF.

Witnesses:
EUGENE S. SULLIVAN,
NICHOLAS HATHAWAY.